US010969791B1

(12) United States Patent
Ebrahimi Afrouzi et al.

(10) Patent No.: US 10,969,791 B1
(45) Date of Patent: Apr. 6, 2021

(54) OBSTACLE RECOGNITION METHOD FOR AUTONOMOUS ROBOTS

(71) Applicants: Ali Ebrahimi Afrouzi, San Diego, CA (US); Soroush Mehrnia, Helsingborg (SE)

(72) Inventors: Ali Ebrahimi Afrouzi, San Diego, CA (US); Soroush Mehrnia, Helsingborg (SE)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 16/570,242

(22) Filed: Sep. 13, 2019

Related U.S. Application Data

(63) Continuation of application No. 15/442,992, filed on Feb. 27, 2017, now Pat. No. 10,452,071.

(60) Provisional application No. 62/301,449, filed on Feb. 29, 2016.

(51) Int. Cl.
G05D 1/02 (2020.01)
B25J 9/16 (2006.01)

(52) U.S. Cl.
CPC .......... *G05D 1/0214* (2013.01); *B25J 9/1676* (2013.01); *B25J 9/1697* (2013.01); *G05D 1/0246* (2013.01)

(58) Field of Classification Search
CPC ................ G05D 1/0253; G05D 1/0246; A47L 2201/04; A47L 2201/06
See application file for complete search history.

(56) References Cited

U.S. PATENT DOCUMENTS

| | | | |
|---|---|---|---|
| 6,591,161 B2 | 7/2003 | Yoo | |
| 6,611,120 B2 | 8/2003 | Song | |
| 6,868,307 B2 | 3/2005 | Song | |
| 6,957,712 B2 | 10/2005 | Song | |
| 7,068,815 B2 | 6/2006 | Chang | |
| 7,218,994 B2 | 5/2007 | Kanda | |
| 7,386,163 B2 | 6/2008 | Sabe | |
| 7,424,341 B2 * | 9/2008 | Watanabe | G06T 1/0014 318/568.1 |
| 7,441,953 B2 | 10/2008 | Banks | |
| 7,478,091 B2 | 1/2009 | Mojsilovic | |
| 7,480,958 B2 | 1/2009 | Song | |
| 7,555,363 B2 | 6/2009 | Augenbraun | |
| 7,627,395 B2 * | 12/2009 | Sadighi | H01L 21/67259 700/245 |
| 7,706,917 B1 | 4/2010 | Chiappetta | |
| 7,720,573 B2 * | 5/2010 | Yamada | B25J 13/06 700/245 |
| 7,761,954 B2 | 7/2010 | Ziegler | |
| 7,805,220 B2 | 9/2010 | Taylor | |
| 7,853,372 B2 | 12/2010 | Park | |

(Continued)

*Primary Examiner* — Yosef Kassa

(57) ABSTRACT

Provided is a robot, including: a plurality of sensors; a processor; a tangible, non-transitory, machine readable medium storing instructions that when executed by the processor effectuates operations including: capturing, with an image sensor, images of a workspace as the robot moves within the workspace; identifying, with the processor, at least one characteristic of at least one object captured in the images of the workspace; determining, with the processor, an object type of the at least one object based on characteristics of different types of objects stored in an object dictionary; and instructing, with the processor, the robot to execute at least one action based on the object type of the at least one object.

20 Claims, 1 Drawing Sheet

(56) References Cited

U.S. PATENT DOCUMENTS

| | | | |
|---|---|---|---|
| 7,912,633 B1 | 3/2011 | Dietsch | |
| 7,957,583 B2 * | 6/2011 | Boca | B25J 9/1697 |
| | | | 382/154 |
| 8,095,237 B2 * | 1/2012 | Habibi | B25J 9/1692 |
| | | | 700/245 |
| 8,170,372 B2 | 5/2012 | Kennedy | |
| 8,179,418 B2 | 5/2012 | Wright | |
| 8,428,778 B2 | 4/2013 | Landry | |
| 8,532,822 B2 * | 9/2013 | Abramson | G05D 1/0265 |
| | | | 700/258 |
| 8,559,699 B2 * | 10/2013 | Boca | B25J 9/1697 |
| | | | 382/153 |
| 8,688,275 B1 | 4/2014 | LaFary | |
| 8,731,295 B2 * | 5/2014 | Schepelmann | G05D 1/0246 |
| | | | 382/173 |
| 8,924,094 B2 * | 12/2014 | Faivre | E02F 9/2029 |
| | | | 701/50 |
| 8,930,019 B2 | 1/2015 | Allen | |
| 9,043,952 B2 * | 6/2015 | Sandin | B60L 50/66 |
| 9,155,675 B2 | 10/2015 | Ye | |

* cited by examiner

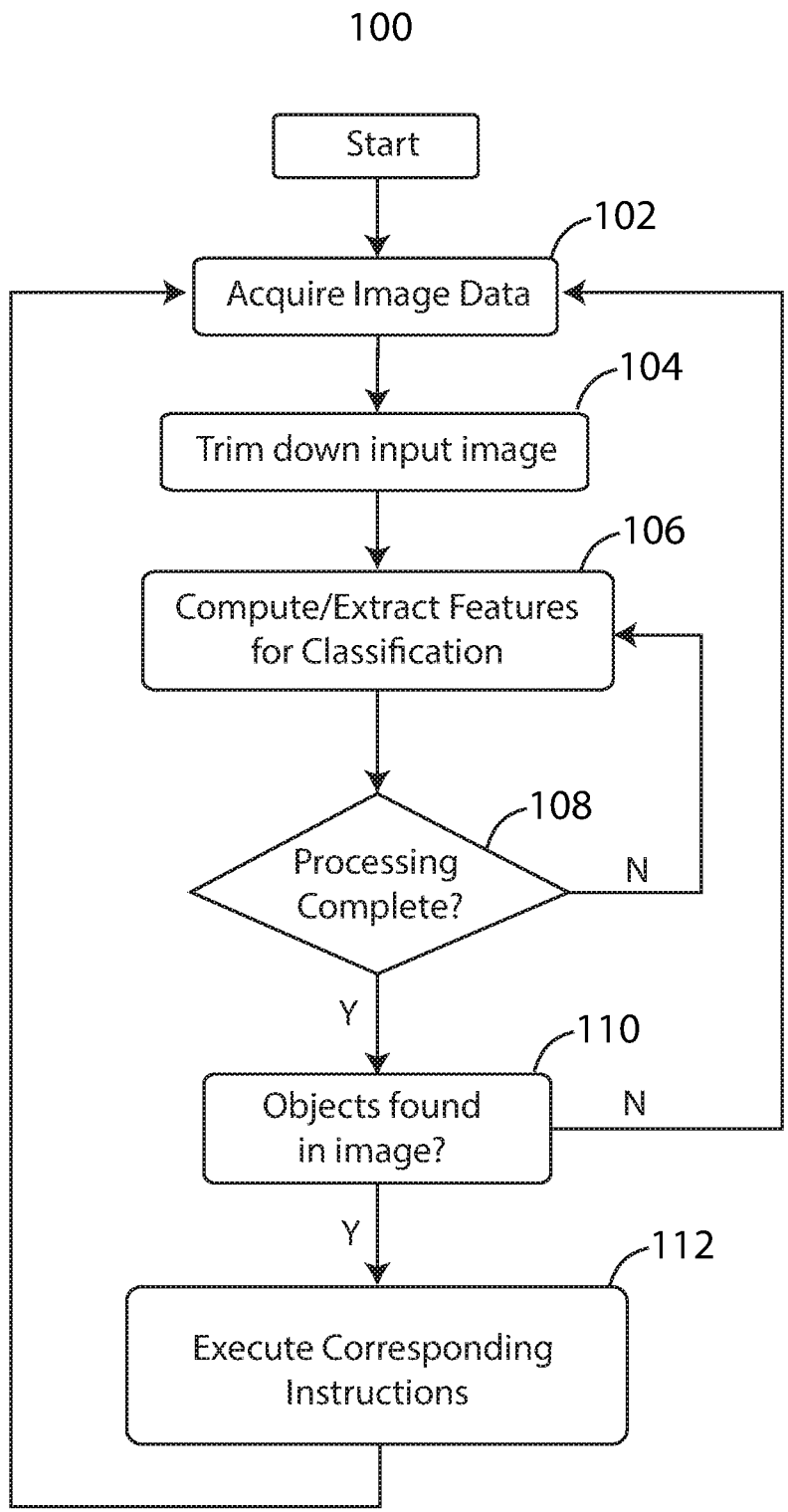

OBSTACLE RECOGNITION METHOD FOR AUTONOMOUS ROBOTS

CROSS-REFERENCE TO RELATED APPLICATIONS

This application is a Continuation of Non-Provisional patent application Ser. No. 15/442,992, filed Feb. 27, 2017, which claims the benefit of Provisional Patent Application No. 62/301,449, filed Feb. 29, 2016, each of which is hereby incorporated by reference.

FIELD OF THE DISCLOSURE

The disclosure relates to identifying objects.

BACKGROUND

Autonomous robots are being used with increasing frequency to carry out routine tasks such as vacuuming, mopping, cutting grass, polishing floors, etc. During operation a robot may encounter objects that may act as an obstruction to the operation of the robot. For example, objects such as cords, wires, clothing, and toys may become stuck in the wheels or other moving parts of the robot as it drives close to or over the objects. Interaction with such objects may cause the robot to malfunction or prevent the robot from completing a task. A method for avoiding entanglement with objects may be useful.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is a robot, including: a plurality of sensors; a processor; a tangible, non-transitory, machine readable medium storing instructions that when executed by the processor effectuates operations including: capturing, with an image sensor, images of a workspace as the robot moves within the workspace; identifying, with the processor, at least one characteristic of at least one object captured in the images of the workspace; determining, with the processor, an object type of the at least one object based on characteristics of different types of objects stored in an object dictionary; and instructing, with the processor, the robot to execute at least one action based on the object type of the at least one object.

Included is a tangible, non-transitory, machine readable medium storing instructions that when executed by a processor effectuates operations including: capturing, with an image sensor of a robot, images of a workspace as the robot moves within the workspace; identifying, with the processor, at least one characteristic of at least one object captured in the images of the workspace; determining, with the processor, an object type of the at least one object based on characteristics of different types of objects stored in an object dictionary; and instructing, with the processor, the robot to execute at least one action based on the object type of the at least one object.

BRIEF DESCRIPTION OF THE DRAWINGS

FIG. 1 illustrates an example of a process for identifying objects, according to some embodiments.

DETAILED DESCRIPTION OF SOME EMBODIMENTS

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments include a method for an autonomous robot to recognize and avoid driving over objects. Some embodiments provide an image sensor and image processor coupled to an autonomous robot and use deep learning to analyze images captured by the image sensor and identify objects in the images. In some embodiments, an object dictionary is included in a memory of the robot such that the processor may compare objects in the images with objects in the object dictionary for similar features and characteristics. Once the processor identifies objects, in some embodiments, the robot alters its navigation path to drive around the objects.

Some embodiments include a method for identifying objects by an autonomous robot. In some embodiments, images of a work environment are captured by an image sensor positioned on the autonomous robot. In some embodiments, an object dictionary containing image data regarding a set of objects is included in the system. Captured images are transmitted to an image processor that processes the images to generate feature vector and identify objects within the images by comparison to objects in the object dictionary. Upon identifying an object in an image as an object from the object dictionary, the system executes a set of preprogrammed responses, which may include altering a movement path to avoid colliding with or driving over the object.

Some embodiments include a method for a processor of an autonomous robot to identify objects (or obstacles) in a work environment and react to the identified objects according to instructions provided by the processor. In some embodiments, an autonomous robot includes an image sensor (e.g., camera) to provide an input image and an object identification and data processing unit, which includes a feature extraction, feature selection and object classifier unit configured to identify a class to which the object belongs. In some embodiments, the identification of the object that is included in the image data input by the camera is based on provided data for identifying the object and the image training data set. In some embodiments, training of the classifier is accomplished through a deep learning method, such as supervised or semi-supervised learning.

In some embodiments, the image sensor, positioned on the body of the autonomous robot, captures images of the environment around the autonomous robot at predetermined angles. In some embodiments, the image sensor may be positioned and programmed to capture images of an area below the autonomous robot. In some embodiments, the images are transmitted to an image processing unit. In some embodiments, the image processing unit performs feature analysis of the images searching for a set of predefined objects. In some embodiments, the predefined objects may include, but is not limited to, obstacles such as cables, cords, socks, and other objects that should be avoided by the autonomous robot.

In some embodiments, central to the object identification system is a classification unit that is previously trained by a method of deep learning in order to recognize predefined objects under different conditions, such as different lighting conditions, camera poses, colors, etc.

In some embodiments, to recognize an object with high accuracy, feature amounts that characterize the recognition target object need to be configured in advance. Therefore, to prepare the object classification component of the data processing unit, different images of the desired objects are introduced to the data processing unit in a training set. After processing the images layer by layer, different characteristics and features of the objects in the training image set including edge characteristic combinations, basic shape characteristic combinations and the color characteristic combinations are determined by the deep learning algorithm(s) and the classifier component classifies the images by using those key feature combinations.

When an image is received via the image sensor, in some embodiments, the characteristics can be quickly and accurately extracted layer by layer until the concept of the object is formed and the classifier can classify the object. When the object in the received image is correctly identified, the robot can execute corresponding instructions. In some embodiments, a robot may be programmed to avoid some or all of the predefined objects by adjusting its movement path upon recognition of one of the predefined objects.

FIG. 1 illustrates an example of an object recognition process 100. In a first step 102, the system acquires image data from the sensor. In a second step 104, the image is trimmed down to the region of interest (ROI). In a third step 106, image processing begins: features are extracted for object classification. In a next step 108, the system checks whether processing is complete by verifying that all parts of the ROI have been processed. If processing is not complete, the system returns to step 106. When processing is complete, the system proceeds to step 110 to determine whether any predefined objects have been found in the image. If no predefined objects were found in the image, the system proceeds to step 102 to begin the process anew with a next image. If one or more predefined objects were found in the image, the system proceeds to step 112 to execute preprogrammed instructions corresponding to the object or objects found. In some embodiments, instructions may include altering the robot's movement path to avoid the object. In some embodiments, instructions may include adding the found object characteristics to a database as part of an unsupervised learning in order to train the system's dictionary and/or classifier capabilities to better recognize objects in the future. After completing the instructions, the system then proceeds to step 102 to begin the process again.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:
1. A robot, comprising:
a plurality of sensors;
a processor;
a tangible, non-transitory, machine readable medium storing instructions that when executed by the processor effectuates operations comprising:
  capturing, with an image sensor, images of a workspace as the robot moves within the workspace;
  identifying, with the processor, at least one characteristic of at least one object captured in the images of the workspace;
  determining, with the processor, an object type of the at least one object based on characteristics of different types of objects stored in an object dictionary, wherein:
    the object dictionary is generated based on a training set of images comprising objects with different object types; and
    at least a portion of the training set of images comprises any of: images of the objects under different lighting conditions, images of the objects from different camera poses, and images of the objects having different object colors; and
  instructing, with the processor, the robot to execute at least one action based on the object type of the at least one object.

2. The robot of claim 1, wherein determining the object type of the at least one object comprises:
determining, with the processor, a class of the at least one object using an object classification unit based on the at least one characteristic.

3. The robot of claim 1, wherein the at least one action comprises driving around the at least one object and continuing along a planned navigation path.

4. The robot of claim 1, wherein the at least one characteristic comprises any of: an edge, a shape, and a color.

5. The robot of claim 1, wherein the image sensor comprises a field of view, the field of view including at least an area ahead of the robot.

6. The robot of claim 1, wherein identifying the at least one characteristic of the at least one object comprises:
determining, with the processor, a region of interest for each image, the region of interest including at least a portion of the at least one object and limiting the identification of the at least one characteristic to the region of interest.

7. The robot of claim 1, further comprising, identifying, with the processor, at least one characteristic of at least one object captured in a new image when a current image does not include an identifiable object.

8. The robot of claim 1, wherein the operations further comprise:
adjusting, with the processor, the object dictionary based on the object type to which the at least one characteristic corresponds.

9. The robot of claim 1, wherein the at least one action comprises driving along a modified navigation path.

10. The robot of claim 1, wherein:
the different object types comprise at least one of: a type of clothing, a cord, a type of toy, a type of animals, a type of food, a type of pet bodily waste, a shoe, a plastic bag, jewelry, shoelaces, earphones, and keys; and
the robot performs at least one of: vacuuming, mopping, cutting grass, and polishing floors.

11. The robot of claim 1, wherein the operations further comprise:
learning, with the processor, the characteristics of the different types of objects using deep learning algorithms, wherein the training set of images are provided as input to the deep learning algorithms.

12. A tangible, non-transitory, machine readable medium storing instructions that when executed by a processor effectuates operations comprising:
capturing, with an image sensor of a robot, images of a workspace as the robot moves within the workspace;
identifying, with the processor, at least one characteristic of at least one object captured in the images of the workspace;
determining, with the processor, an object type of the at least one object based on characteristics of different types of objects stored in an object dictionary, wherein:
the object dictionary is generated based on a training set of images comprising objects with different object types; and
at least a portion of the training set of images comprises any of: images of the objects under different lighting conditions, images of the objects from different camera poses, and images of the objects having different object colors; and
instructing, with the processor, the robot to execute at least one action based on the object type of the at least one object.

13. The media of claim 12, wherein determining the object type of the at least one object comprises:
determining, with the processor, a class of the at least one object using an object classification unit based on the at least one characteristic.

14. The media of claim 12, wherein the at least one action comprises driving around the at least one object and continuing on a planned navigation path.

15. The media of claim 12, wherein the at least one characteristic comprises any of: an edge, a shape, and a color.

16. The media of claim 12, wherein identifying the at least one characteristic of the at least one object comprises:
determining, with the processor, a region of interest for each image, the region of interest including at least a portion of the at least one object and limiting the identification of the at least one characteristic to the region of interest.

17. The media of claim 12, further comprising, identifying, with the processor, at least one characteristic of at least one object captured in a new image when a current image does not include an identifiable object.

18. The media of claim 12, wherein the operations further comprise:
adjusting, with the processor, the object dictionary based on the object type to which the at least one characteristic corresponds.

19. The media of claim 12, wherein the at least one action comprises driving along a modified navigation path.

20. The media of claim 12, wherein the different object types comprise at least one of: a type of clothing, a cord, a type of toy, a type of animals, a type of food, a type of pet bodily waste, a shoe, a plastic bag, jewelry, shoelaces, earphones, and keys.

* * * * *